United States Patent [19]

Nishio et al.

[11] Patent Number: 4,996,024

[45] Date of Patent: Feb. 26, 1991

[54] METHOD FOR CASTING POWDER

[75] Inventors: Hiroaki Nishio; Akira Kato, both of Tokyo, Japan

[73] Assignee: NKK Corporation, Tokyo, Japan

[21] Appl. No.: 393,622

[22] Filed: Aug. 14, 1989

[30] Foreign Application Priority Data

Sep. 2, 1988 [JP] Japan .................................. 63-218300

[51] Int. Cl.⁵ ................................................ B22F 1/00
[52] U.S. Cl. ......................................... 419/40; 264/86; 264/233; 264/344
[58] Field of Search ...................... 419/40; 264/86, 63, 264/233, 344

[56] References Cited

U.S. PATENT DOCUMENTS

| | | | |
|---|---|---|---|
| 2,979,401 | 4/1961 | Szymaszek | 419/40 |
| 4,341,725 | 7/1982 | Weaver et al. | 264/28 |
| 4,737,332 | 4/1988 | Miyashita et al. | 264/233 |
| 4,820,462 | 4/1989 | Nakajima et al. | 264/63 |

FOREIGN PATENT DOCUMENTS 0206685 12/1986 European Pat. Off. .
2168284 6/1986 United Kingdom .

Primary Examiner—Brooks H. Hunt
Assistant Examiner—Ngollan T. Mai
Attorney, Agent, or Firm—Sughrue, Mion, Zinn, Macpeak & Seas

[57] ABSTRACT

A method for casting a metal or ceramic powder which comprises casting a slurry of the metal or ceramic powder suspended in a dispersion medium containing at least 10 wt. % of a liquid extractable with a supercritical fluid or a liquefied gas into a porous mold, keeping the slurry placed in the porous mold at a temperature not lower than the melting point of the dispersion medium, and extracting at least 10 wt. % of the dispersion medium with the supercritical fluid or liquefied gas to impart a formability to the extracted body.

In the method of the invention, since the volume change of the dispersion medium due to phase change does not occur, the internal strain and deformation of the molded body occur little. As a result, the sintered body obtained has a highly dimensional accuracy.

6 Claims, 4 Drawing Sheets

METHOD FOR CASTING POWDER

BACKGROUND OF THE INVENTION

1. Field of the Invention

This invention relates to a method for casting a metal or ceramic powder which comprises suspending the powder into a liquid dispersion medium to form a slurry and casting the slurry into a mold.

2. Description of the Prior Art

Casting method is known as a molding method of metal powder, ceramic powder, and a mixture of metal powder and ceramic powder.

The inventors disclosed in Japanese Pat. KOKAI No. 62-192502 a molding method of metal powder or ceramic powder which comprises suspending the powder into a dispersion medium of which the principal component is a material having a melting point of 0° to 100° C. being extractable with liquid or supercritical carbon dioxide, and casting the slurry into a liquid-unabsorbable mold. In this method, the cast slurry is cooled to freeze it, and then demolded. Subsequently, the principal component of the dispersion medium in the frozen body is extracted with liquid or supercritical carbon dioxide. The extracted body is heated, and the residual dispersion medium is removed by thermal decomposition. The molded body thus obtained is densified by sintering to obtain a sintered body. An outline of the above process is shown in FIG. 7. The sintered body is machined if necessary, and used for a cutting tool, a machine part or the like.

The above casting method for metal or ceramic powder is excellent in obtaining a molded body in a short time without the generation of cracks, but has the following problems. In the above method, the volume change of the slurry occurs during freezing. For example, when paraffin wax is used as the dispersion medium, a volumetric shrinkage of about 25% occurs. The freezing begins at the portion to touch the mold, and strain generates on the inside of the treated body by the freezing of the outside. Therefore, the freezed body is more or less deformed. By the deformation, the molded body is sometimes broken during demolding. The degree of the deformation sharply varies according to the temperature of the slurry, casting pressure, the temperature of the mold cooling dispersion medium and pressuring time, and therefore, suitable casting conditions must be set requiring trial and error experiments for a long time. The internal strain occurred in the molding process is released during the extraction with a supercritical fluid or a liquefied gas, thermal decomposition or sintering, and deformation proceeds to decrease accuracy to size. In the case of a big profile body, the above problems are more remarkable.

SUMMARY OF THE INVENTION

An object of the invetion is to provide a method for casting a metal or ceramic powder which is excellent in molding in a short time wherein internal strain and deformation occur little and a sintered body having a highly dimensional accuracy can be obtained.

Another object of the invention is to provide a method for casting a metal or ceramic powder which does not require trial and error experiments for setting the casting conditions.

Still another object of the invention is to provide a method for casting a metal or ceramic powder which facilitates demolding of the molded body.

The present inventors have investigated in order to achieve the above objects, and completed the present invention by employing a porous mold and extracting at least a part of the dispersion medium until the shape of the molded body can be kept.

Thus, the present invention provides a method for casting a metal or ceramic powder which comprises casting a slurry of the metal or ceramic powder suspended in a dispersion medium containing at least 10 wt. % of a liquid extractable with a supercritical fluid or a liquefied gas into a porous mold, keeping the slurry placed in the porous mold at a temperature not lower than the melting point of the dispersion medium, and extracting at least 10 wt. % of the dispersion medium with the supercritical fluid or liquefied gas to impart a formability to the extracted body.

DETAILED DESCRIPTION OF THE INVENTION

Figure 1:
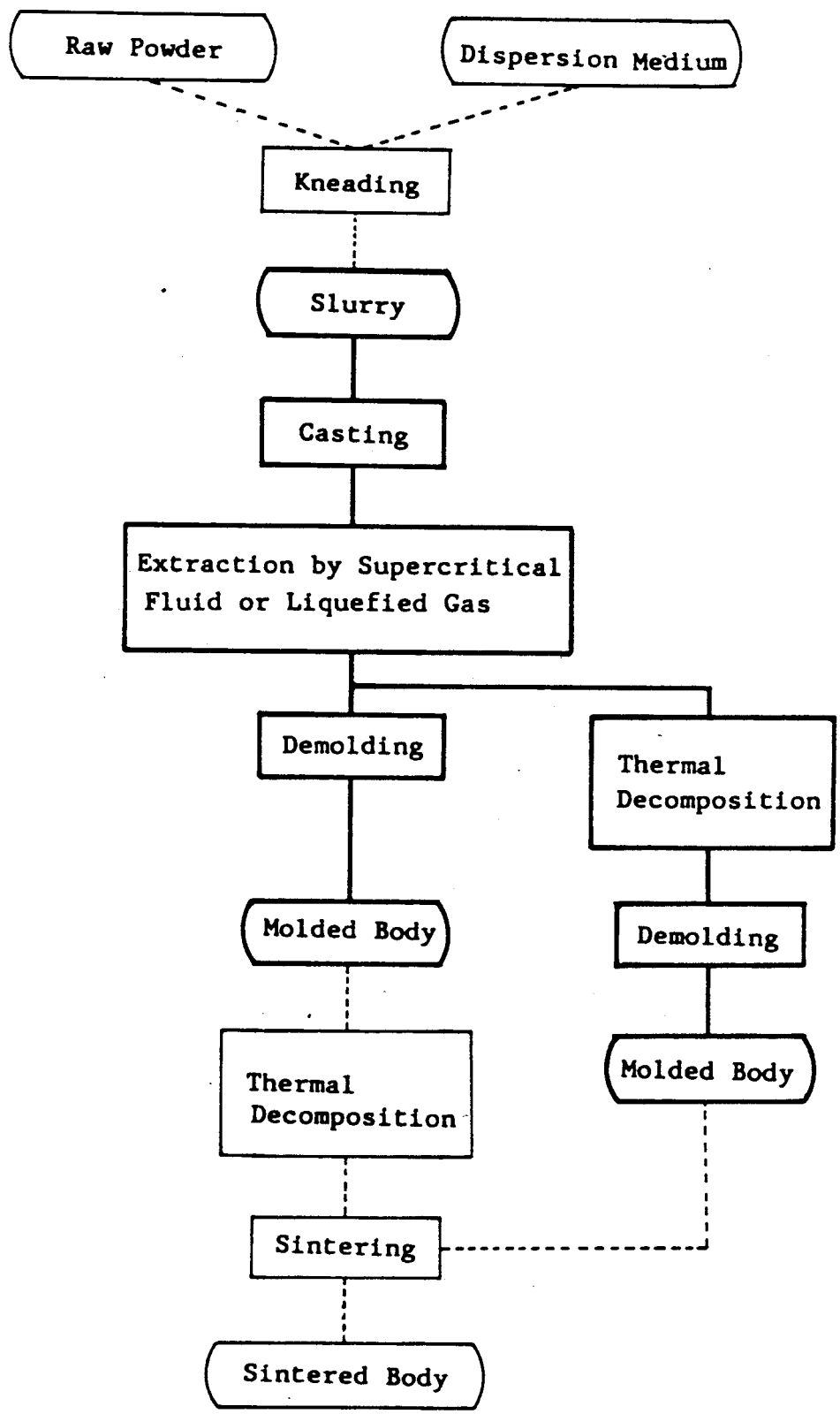
FIG. 1 is a flow diagram illustrating the method of the invention.

The powder molded by the method of the invention is a metal powder such as 2% Ni-98% Fe mixed powder, SUS 316 powder or high speed steel, a ceramic powder such as alumina powder, zirconia powder, silicon nitride powder or silicon carbide powder or a mixed powder of metal and ceramic such as tungsten carbide-cobalt mixed powder or titanium carbide-nickel mixed powder. A suitable particle size of the powder is about 0.2 to 100 $\mu$m.

The dispersion medium for suspending the metal or ceramic powder impart fluidity thereto, but the role as a binder for molding is not necessary, different from the conventional method. In the method of the invention, the fluidity of the cast slurry is lost by extracting at least 10 wt. % of the dispersion medium with a supercritical fluid or liquefied gas, and the formability is generated to obtain a mold body. The dispersion medium contains at least 10 wt. % of a liquid which is extractable with the supercritical fluid or the liquefied gas. There are many liquids being in conformity with the above object, such as alcohols including methanol, ethanol, propanol and butanol, ketones including acetone, hydrocarbons including hexane and benzene, and liquid paraffin. The dispersion medium may be composed of such a liquid alone.

When a suitable fluidity is not obtained by the above liquid alone, the fluidity of the dispersion medium may be controlled by adding a dispersing agent such as oleic acid or a thickner such as polyvinyl alcohol, polyvinyl butyral, methyl cellulose, carboxymethyl cellulose, ethyl cellulose, paraffin wax or phenol resin.

The concentration of the slurry of the metal or ceramic powder is preferably higher in the range capable of securing the fluidity necessary for casting, and a suitable concentration 45 to 85 vol. %. When the concentration is less than 45 vol. %, densification in the sintering process is difficult. While, when the concentration is beyond 85 vol. %, to obtain the fluidity necessary for casting is difficult, even though various devices are conducted such as in the particle size distribution of the powder and in the blending of a dispersing agent. A suitable fluidity of the slurry is in the viscosity range of 50 to $10^4$ poise.

Preferable supercritical fluids and liquefied gases are the materials having a critical temperature of 0° to 140° C., such as carbon dioxide, ethane, propane, ethylene, dichlorodifluoromethane, monochlorotrifluoromethane and ammonia, in view of efficient extraction.

The porous mold must have a strength resistant to the pressure at the time of casting the slurry and gas permeability to permeate the supercritical fluid or the liquefied gas from the whole outer surface to the whole inner surface. Suitable materials for the mold include gypsum, the ceramic powder blended with an organic binder, porous sintered ceramics of alumina and the like, porous sintered metals of stainless steel and the like, and foamed organic materials such as foamed polystyrene and foamed polyurethane. Examples of the ceramic powder blended with an organic binder include a ceramic powder such as silica sand, alumina or the same ceramic powder as employed for the slurry blended with an organic binder such as ethyl silicate hydrolyzate, polyvinyl alcohol, polyvinyl butyral, methyl cellulose, carboxymethyl cellulose, ethyl cellulose, paraffin wax, phenol resin or epoxy resin.

Figure 2:
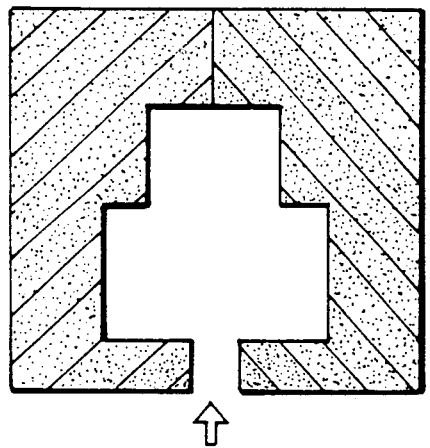
FIG. 2 is a sectional view of a mold used for the method of the invention.
Figure 3:
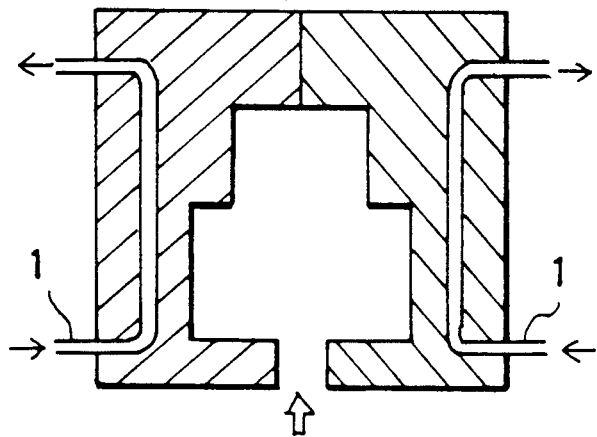
FIG. 3 is a sectional view of a mold used for a conventional method.
Figure 4:
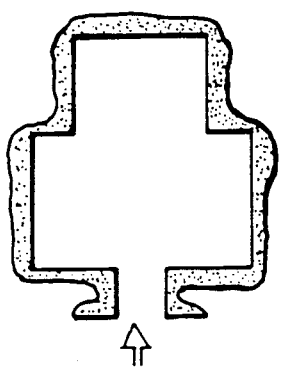
FIG. 4 is a sectional view of another mold used for the method of the invention.

An example of the porous mold for the method of the invention is shown in FIG. 2. This mold is a split mold, and it can be used repeatedly. On the other hand, a mold for a conventional mold having the same cavity is shown in FIG. 3. A cooling pipe 1 is provided on the inside of the conventional mold, and the mold is composed of a material having a high heat conductivity such as aluminum for efficient cooling. Therefore, the conventional mold is necessarily composed of an expensive material and has a complex structure. Another example of the porous mold for the method of the invention belonging to shell mold is shown in FIG. 4. This mold is produced by making the pattern of wax, resin such as urea resin, urea or the like, having the shape corresponding to the cavity of the mold, coating the surface of the pattern with a mixture of a ceramic powder and an organic binder in a prescribed thickness, and removing the pattern by steam treatment, thermal decomposition, washing with water or the like. The shell mold is a throwaway type, and has an advantage to meet a complex shaped molding. The organic binder of the shell mold may be a thermally decomposable material. In this case, after the slurry in the mold is imparted with formability by the extraction with the supercritical fluid or the liquefied gas, the shell mold containing the extracted body is heated to remove the organic binder together with the residual dispersion medium in the extracted body by thermal decomposition. As a result, the strength of the shell mold decreased, and the following demolding process is facilitated or omitted by self collapse. Suitable organic binders for that purpose include polyvinyl alcohol, polyvinyl butyral, methyl cellulose, carboxymethyl cellulose and ethyl cellulose. A suitable temperature for the thermal decomposition of the binder is 400° to 1200° C.

In the method of the invention, the temperature is preferably not changed through from the casting process to the extraction process. When the temperature varies, the slurry is expanded or contracted resulting to generate internal strain in the molded body. In order to avoid the occurrence of internal strain, preferably, the slurry temperature through from casting to extracting is kept in the range of 0° to 140° C., particularly 20° to 60° C., being not so apart from the room temperature, and the slurry temperature difference between at casting and at extracting is not more than 40° C.

The metal or ceramic powder is kneaded with the dispersion medium, and the slurry is cast into the porous mold. The porous mold containing the slurry is placed in an extacting apparatus, and the supercritical fluid or the liquefied gas is introduced into the apparatus as an extracting agent. The extracting agent permeates the porous mold, and isotropic pressure is added to the surface of the slurry by the extracting agent. Thus, extractable components of the dispersion medium is removed by the extraction. The extraction is continued at least until formability is imparted to the slurry in mold, and then, the porous mold containing the extracted body is taken out of the extracting apparatus. The mold is detached from the article to obtain a molded body. The flow diagram of the method of the invention is shown in FIG. 1.

In the case of a shell mold being a throwaway type, after the extracting process, the mold may be conducted with a thermal decomposition process, and the organic binder in the shell mold is thermally decomposed together with the residual dispersion medium in the extracted body to decrease the strength of the mold or to be collapsed by itself. Subsequently, a demolding process is conducted to obtain a molded body.

The molded body is treated with a sintering process to obtain a dense sintered body.

In the conventional method, the slurry is molded by utilizing freezing of the dispersion medium. Whereas, in the method of the invention, the fluidity of the slurry is lost by extracting at least 10 wt. % of the dispersion medium kept in a liquid state with the supercritical fluid or the liquefied gas, and thereby, the molded body is obtained.

Therefore, in the method of the invention, since the volume change of the dispersion medium due to phase change does not occur, the internal strain and deformation of the molded body occur little. As a result, the sintered body obtained has a highly dimensional accuracy. In the conventional method, trial and error experiments are necessary for determining suitable casting conditions, whereas, in the method of the invention the above trial and error experiments are not necessary. Moreover, when the porous mold is pressured with a high pressure supercritical fluid or a liquefied gas, the extracting agent permeates the porous mold, and the surface of the slurry in the mold is pressured by the isotropic pressure of the extracting agent. A little gap generates between the mold by the pressure, and the gap facilitates demolding remarkably.

EXAMPLES

EXAMPLE 1

Figure 5:
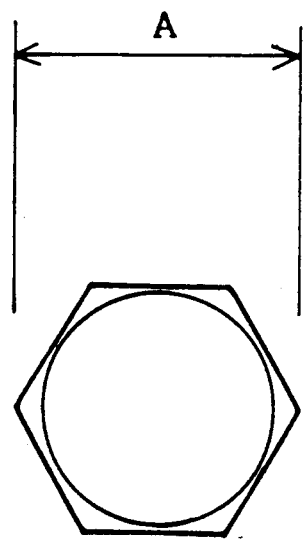
FIG. 5 is a plan view of a molded body.
Figure 6:
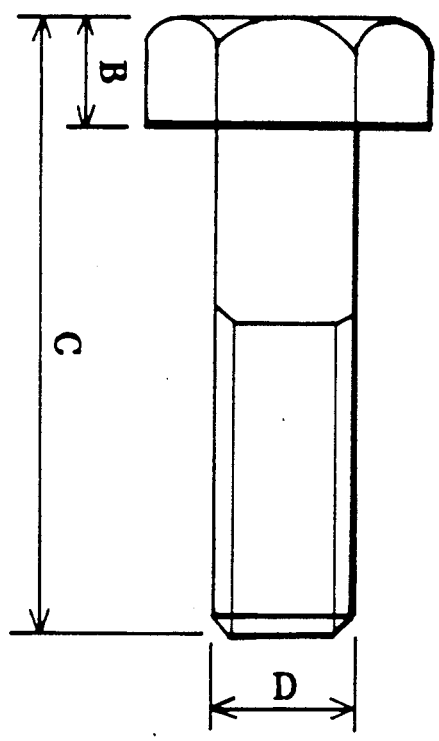
FIG. 6 is a front view thereof.
Figure 7:
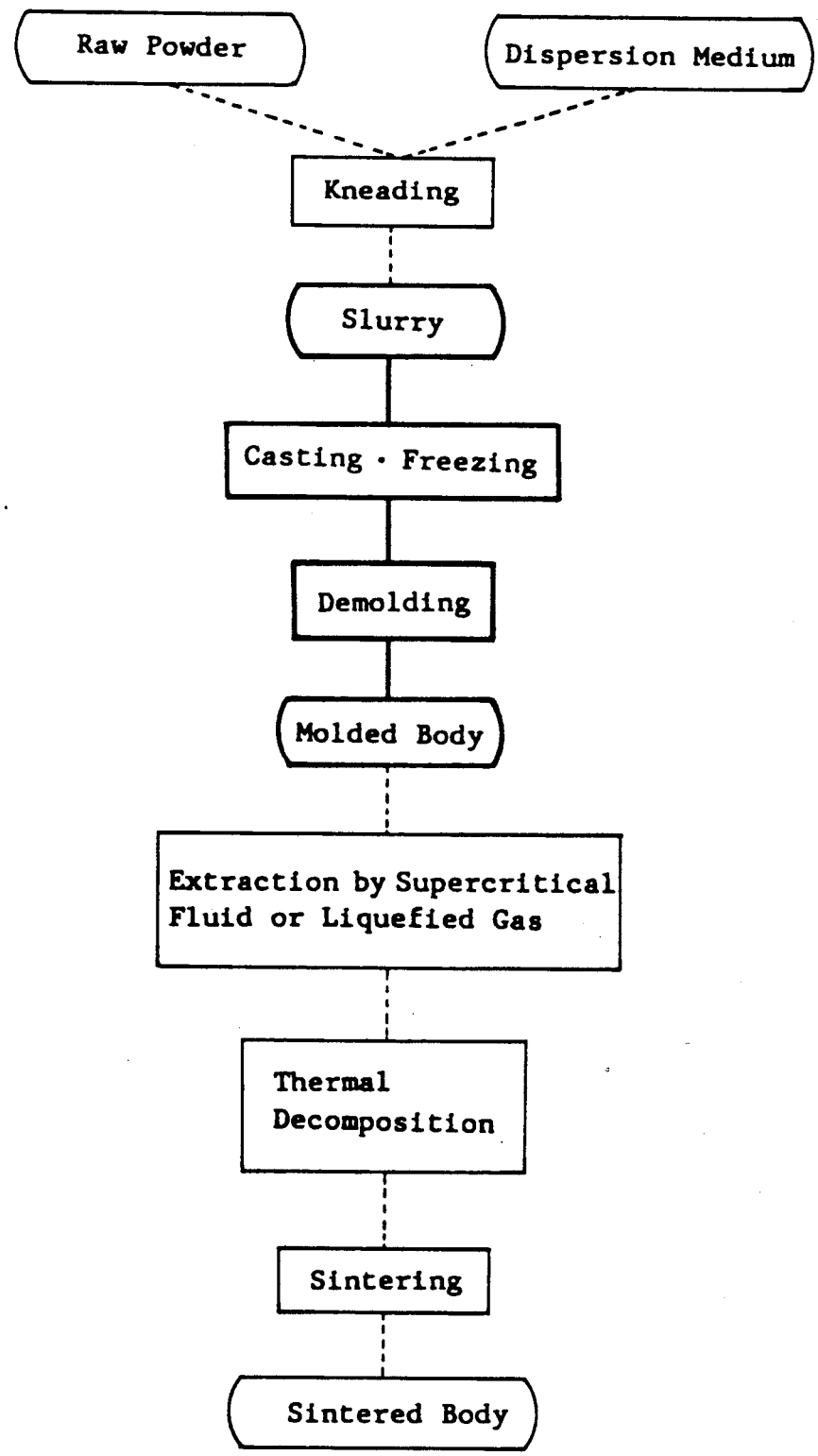
FIG. 7 is a flow diagram illustrating a conventional method.

A silicon nitride bolt was prepared. A raw powder composed of 92 parts by weight of $Si_3N_4$ having a mean particle size of 0.75 μm and 6.0 parts by weight of $Y_2O_3$ having a mean particle size of 0.5 μm and 2.0 parts by weight of $Al_2O_3$ having a mean particle size of 1.20 μm as sintering aids was mixed with 27.6 parts by weight of liquid paraffin and 3.0 parts by weight of oleic acid, and kneaded for 24 hours. The obtained slurry was defoamed by exposing it to vacuum. A shell mold having a cavity corresponding to the bolt shown in FIG. 5 and FIG. 6 was formed by using a mixture of 100 parts by weight of the above silicon nitride and 5 parts by weight of polyvinyl butyral as a binder. The above slurry was cast into the shell mold at 22° C. at a casting pressure of 3 kg/cm². The casting pressure was temporarily decreased at the start of casting. After the casting pressure was recovered up to 3 kg/cm², the mold containing the slurry was immediately detached. The mold was placed in an extracting apparatus, and the extraction was carried out by passing supercritical carbon dioxide at 200kg/cm² at 32° C. for 4 hours. Thus, a mixture of liquid paraffin and oleic acid corresponding to 68 wt. % of the dispersion medium in the slurry was extracted. Subsequently, the mold was placed in a pressure dewaxing furnace, and the temperature was elevated at an elevating speed of 100° C./hr under nitrogen gas atmosphere by passing it at a pressure of 6 kg/cm². When the temperature reached 500° C., the temperature was kept for 1 hour. Then, the mold containing the extracted body was naturally cooled, and the pressure was returned to atmospheric pressure. The mold was very fragile, and it was easily removed to obtain a sound molded body. The molded body was buried in a packing powder composed of 50 wt. % of $Si_3N_4$ and 50 wt. % of $SiO_2$, and placed in a sintering furnace. The temperature was elevated to 1200° C. in vacuo, and kept for 30 minutes. Subsequently, the temperature was further elevated to 1800° C., which nitrogen gas was passed at 9.5 kg/cm², and kept for 2 hours. The molded body was cooled to 1000° C., while the gas pressure was kept at 9.5 kg/cm². Then, the pressure was returned to atmospheric pressure, and the molded body was naturally cooled.

Thus, a sintered body having a theoretical density ratio of 98.1% was obtained. Each contraction ratio at the part A, the part B, the part C and the part D of the bolt-shaped sintered body was measured, and the results are shown in Table 1. The dispersion of the contraction ratios was only 0.2%.

TABLE 1

| Part | Mold Size (mm) | Sintered Body of Example 1 Size (mm) | Sintered Body of Example 1 Contraction Ratio (%) | Sintered Body of Comparative Example 1 Size (mm) | Sintered Body of Comparative Example 1 Contraction Ratio (%) |
|---|---|---|---|---|---|
| A | 31.0 | 25.4 | 18.1 | 25.3 | 18.4 |
| B | 12.2 | 10.0 | 18.0 | 9.9 | 18.9 |
| C | 73.2 | 60.0 | 18.0 | 59.3 | 19.0 |
| D | 16.5 | 13.5 | 18.2 | 13.4 | 18.8 |
| Max-Min | — | — | 0.2 | — | 0.6 |

COMPARATIVE EXAMPLE 1

A comparative silicon nitride bolt was prepared by using a bolt mold having the same shape and size as employed in Example 1. 100 parts by weight of the same raw powder as Example 1 was mixed with 27.6 parts by weight of paraffin having a melting point of 42° C. and 3.0 parts by weight of oleic acid, and kneaded at 90° C. for 24 hours. The obtained slurry was defoamed by exposing it to vacuum. The slurry was cast at 90° C. at a casting pressure of 3 kg/cm² into a mold cooled by passing a cooling water at 10° C. After the casting pressure was recovered up to 3 kg/cm², the state was kept for 5 minutes for completing the freezing of the slurry, and then, the molded body was demolded. Subsequently, the molded body was placed in the extracting apparatus, and extraction was carried out by passing supercritical carbon dioxide at 200 kg/cm² at 60° C. for 4 hours. Thus, a mixture of paraffin and oleic acid corresponding to 62 wt. % of the dispersion medium in the slurry was extracted. Subsequently, the molded body was dewaxed and then sintered under the same conditions as Example 1, and a sintered body having a theoretical density ratio of 98.4% was obtained. Each contraction ratio of the sintered body was measured, and the results are also shown in Table 1. The dispersion of the contraction ratios was 0.6%, and it was inferior to those of Example 1.

EXAMPLE 2

A sintered cemented carbide bolt was prepared. A raw powder composed of 90.0 parts by weight of WC having a mean particle size of 1.5 μm and 10.0 parts by weight of Co having a mean particle size of 1.3 μm was mixed with 8.2 parts by weight of benzene and 0.15 part by weight of cetyl alcohol, and ground by a small ball mill having cemented carbide balls and cemented carbide lining for 48 hours. 0.6 part by weight of ethyl cellulose and 0.6 part by weight of stearic acid were added to the slurry, and mixed for 2 hours with stirring. The slurry was adjusted to 25° C., and defoamed at 400 Torr. Immediately, the slurry was cast into a split gypsum mold having a bolt-shaped cavity shown in FIG. 5 and FIG. 6 at 25° C. at a casting pressure of 7 kg/cm². After the casting pressure was recovered up to 7 kg/cm², the mold containing the slurry was immediately detached. The mold was placed in the extracting apparatus, and the extraction was carried out by passing liquefied dichlorodifluoromethane gas at 100 kg/cm² at 35° C. for 1 hour. Thus, 12 wt. % of the dispersion medium in the slurry was extracted. The split gypsum mold was detached to obtain a bolt-shaped molded body.

We claim:

1. A method for casting a metal or ceramic powder which comprises casting a slurry of the metal or ceramic powder suspended in a dispersion medium containing at least 10 wt. of a liquid extractable with a supercritical fluid or a liquefied gas and excluding a binder into a porous mold, keeping the slurry placed in the porous mold at a temperature not lower than the melting point of the dispersion medium, and extracting at least 10 wt. % of the dispersion medium with the supercritical fluid or liquefied gas to impart a formability to the extracted body.

2. The method of claim 1 wherein said liquid is selected from the group consisting of methanol, ethanol, propanol, butanol, acetone, hexane, benzene and liquid paraffin.

3. The method of claim 1 wherein the supercritical fluid and the liquefied gas are a material having a critical temperature of 0° to 140° C.

4. The method of claim 1 wherein the supercritical fluid and the liquefied gas are selected from the group consisting of carbon dioxide, ethane, propane, ethylene, dichlorodifluoromethane, monochlorotrifluoromethane and ammonia.

5. The method of claim 1 wherein the mold is a shell mold containing an organic binder selected from the group consisting of polyvinyl alcohol, polyvinyl butyral, methyl cellulose, carboxymethyl cellulose and ethyl cellulose.

6. The method of claim 1 wherein the slurry temperature through from casting to extracting is kept in the range of 0° to 140° C., and the slurry temperature difference between at casting and at extracting is not more than 40° C.

* * * * *